United States Patent [19]
Grodevant

[11] Patent Number: 5,773,816
[45] Date of Patent: Jun. 30, 1998

[54] PHOTODETECTOR INTEGRATOR CIRCUIT HAVING A WINDOW COMPARATOR

[75] Inventor: Scott R. Grodevant, Hilton, N.Y.

[73] Assignee: Lucid Technologies Inc., Henrietta, N.Y.

[21] Appl. No.: 740,343

[22] Filed: Oct. 7, 1996

[51] Int. Cl.$^6$ .................................................. H01J 40/14
[52] U.S. Cl. ................................. 250/214 R; 250/214 L; 250/214 LA; 356/223
[58] Field of Search .......................... 250/214 R, 214 L, 250/214 LA, 214 LS, 214 P; 356/223, 221, 222, 229; 396/167, 172, 221, 231; 327/310, 315, 317, 336, 350

[56] References Cited

U.S. PATENT DOCUMENTS 4,306,807  12/1981  Sakane et al. ........................... 356/223

*Primary Examiner*—Que Le
*Attorney, Agent, or Firm*—M. LuKacher; K. LuKacher

[57] ABSTRACT

An improved photodetector integrator circuit is provided having a photodetector, such as a photodiode, which produces photocurrent responsive to incident illumination. The photodetector is coupled to an integrator stage which converts the photocurrent into voltage and integrates the voltage over an integration period to provide an output signal. A window comparator in the circuit receives the output signal from the integrator stage and compares the output signal to a first threshold and a second threshold to provide, as a measurement signal, a pulse having a width which corresponds to the time interval over which the output signal increases from the first threshold to the second threshold. In the window comparator, the second threshold is greater than the first threshold. The integrator stage has two inputs coupled across the photodetector which are biased by a bias voltage below the first threshold, and a switch, preferably a mechanical relay, coupled to the integrator stage which when enabled resets the integrator stage to provide its output signal substantially equalling the bias voltage. A programmed microcontroller may also be provided for controlling the switch to reset the integrator stage, determining the time interval corresponding to the width of the pulse, and measuring the photocurrent produced by the photodetector responsive to the determined time interval. The circuit can be used in an optical analyzing instrument, such as spectrophotometer, to increase accuracy for measuring photocurrents.

24 Claims, 3 Drawing Sheets

PHOTODETECTOR INTEGRATOR CIRCUIT HAVING A WINDOW COMPARATOR

RELATED APPLICATIONS

This application is related to application Ser. No. 08/210,806 filed Mar. 18, 1994, and Application Serial No. 08/330,339 filed Oct. 27, 1994. Both applications are assigned to the same assignee as the present application.

FIELD OF THE INVENTION

The present invention relates to a photodetector integrator circuit, and more particularly to a photodetector integrator circuit which is used for measuring the photocurrent produced by a photodiode responsive to incident illumination. This circuit is suitable for optical analyzing instruments to improve the accuracy for measuring photocurrents.

BACKGROUND OF THE INVENTION

Typically, photodetector integrator circuits are used in optical analyzing instruments, such as spectrophotometers, for measuring photocurrent produced by a photodetector responsive to incident illumination. For example, the photodetector may be a photodiode. Generally, photodetector integrator circuits have an integrator stage connected to the photodetector for producing an analog voltage signal proportional to the photocurrent. The integrator stage consists of a transconductance amplifier and an integrating capacitor. The analog voltage signal from the integrator stage, i.e., from its amplifier, is sent to a microprocessor via an analog-to-digital (A/D) converter, which converts the amplitude of the analog voltage signal to a digital signal. Connected to the integrator stage is a solid-state switching device for providing a path to discharge the integrating capacitor. The solid-state switching device is enabled by the microprocessor to reset this capacitor to a zero voltage at the start of a fixed integration period. During the integration period, the photocurrent produced by the photodetector is integrated by the integrator stage into an analog voltage signal. At the end of the integration period, the analog voltage signal is digitized by the A/D converter and then the digital voltage signal is used by the microprocessor to calculate the photocurrent produced by the photodetector, thereby measuring the incident illumination.

One problem with typical photodetector integrator circuits, such as discussed above, is that they often cannot accurately measure photocurrents due to excessive leakage current or charge injection into the integrator stage. Leakage current and charge injection cause errors, called integration errors, in the amplitude of the analog voltage signal from the integrator stage. These sources of integration errors are principally those discussed below.

One source of integration errors is charge injection into the integrator stage at the start of each integration period. When the solid-state switching device is closed by the microprocessor via a control signal, part of the energy of the control signal is stored due to capacitive coupling within the solid-state switching device. At the start of each integration period, the solid-switch switching device is opened by the microprocessor via the control signal, and the stored charge is injected into the integrator stage. This causes an integration error to occur because the integrator stage integrates both this injected charge and the photocurrent from the photodetector, thereby offsetting the analog voltage signal from the integrator stage at the start of each integration period.

Another source of integration errors is leakage current generated by the amplifier of the integrator stage. Conventionally, this amplifier is a CMOS type device having reversed-bias diodes to protect the device from electrostatic discharge (ESD). As the bias across these diodes is increased from its normal negative value to zero and then positive, their leakage current increase drastically (roughly an order of magnitude per volt). The leakage current flows through these diodes into the amplifier, and is integrated with the photocurrent, thereby causing integration errors in the analog voltage signal from the integrator stage. Often, even when the protection diodes are absent in the amplifier, parasitic structures can be present at the amplifier inputs which act similarly to these diodes in causing leakage current into the integrator stage.

A further source of integration errors is leakage current into the integrator stage from the solid-state switching device. Solid-state switching devices typically generate picoamperes to microamperes of leakage current. This leakage current flows into the input of the amplifier and is integrated with the photocurrent, causing integration errors in the analog voltage signal from the integrator stage. It is desireable to reduce integration errors caused by the above three sources to provide a photodetector integrator circuit which can be used to accurately measure small photocurrents.

Another problem with typical photodetector integrator circuits is that they depend on the use of an A/D converter to digitize the analog voltage signal from the integrator stage. The A/D converter has the adverse effect of the increasing manufacturing costs since it is typically an expensive component. Furthermore, the conventional A/D converter used with an integrator circuit has a resolution between 12 and 16 bits. This limits the dynamic range of a photodetector integrator circuit by limiting the resolution of the digitized voltage signal from the integrator stage to the number of bits of the A/D converter. Thus, it is desireable to provide a photodetector integrator circuit which does not require the use of an A/D converter, but still provides the same or better dynamic range.

A still further problem with typical photodetector integrator circuits is that their performance can vary due to temperature variation of their components, especially the amplifier of the integrator stage. Thus, the analog voltage signal from the integrator stage may be inconsistent for similar incident illumination on the photodetector at different temperatures. This inconsistency reduces the accuracy of photocurrent measurement. Therefore, it is further desireable to provide a photodetector integrator circuit which has reduced sensitivity to temperature.

SUMMARY OF THE INVENTION

Accordingly, it is an object of the present invention to provide an improved photodetector integrator circuit which can be used to increase the accuracy of measuring photocurrents from a photodetector by reducing the above defined integration errors. The term photodetector as used herein is generic and covers in addition to photodiodes, arrays of diodes, charged coupled devices, and other elements which generate current in response to photon (light) energy and other forms of radiant energy.

It is another object of the present invention to provide an improved photodetector integrator circuit which does not require the use of an A/D converter.

It is also an object of the present invention to provide an improved photodetector integrator circuit having the capability of measuring photodetector current with a dynamic range greater than 16 bits.

A still further object of the present invention is to provide an improved photodetector circuit having a performance which is less sensitive to temperature variation than typical known photodetector integrator circuits.

A yet further object of the present invention is to provide an improved photodetector integrator circuit which can utilize the input capture register of a microcontroller, or a similar pulse width measuring circuit.

Briefly described, a circuit embodying the present invention has a photodetector which produces a photocurrent responsive to incident illumination. The photodetector is coupled to an integrator stage which converts the photocurrent into voltage and integrates the voltage over an integration period to provide an output signal. A window comparator in the circuit receives the output signal from the integrator stage and compares the output signal to a first threshold and a second threshold to provide, as a measurement signal, a pulse having a width which corresponds to the time interval over which the output signal increases from the first threshold to the second threshold. In the window comparator, the second threshold is greater than the first threshold.

The integrator stage may further have two inputs coupled across the photodetector which are biased by a bias voltage below the first threshold, and a switch, preferably a mechanical relay, coupled to the integrator stage which when enabled resets the integrator stage to provide its output signal substantially equalling the bias voltage. A programmed microcontroller, for example, provides means for controlling the switch to reset the integrator stage, determining the time interval corresponding to the width of the pulse providing the measurement signal, and measuring the photocurrent produced by the photodetector responsive to: the capacitance of an integrating capacitor in the integrator stage; the difference between the second and first thresholds; and the reciprocal of the determined time interval.

BRIEF DESCRIPTION OF THE DRAWINGS

The foregoing objects, features and advantages of the invention will become more apparent from a reading of the following description in connection with the accompanying drawings, in which.

DESCRIPTION OF THE INVENTION

Figure 1:
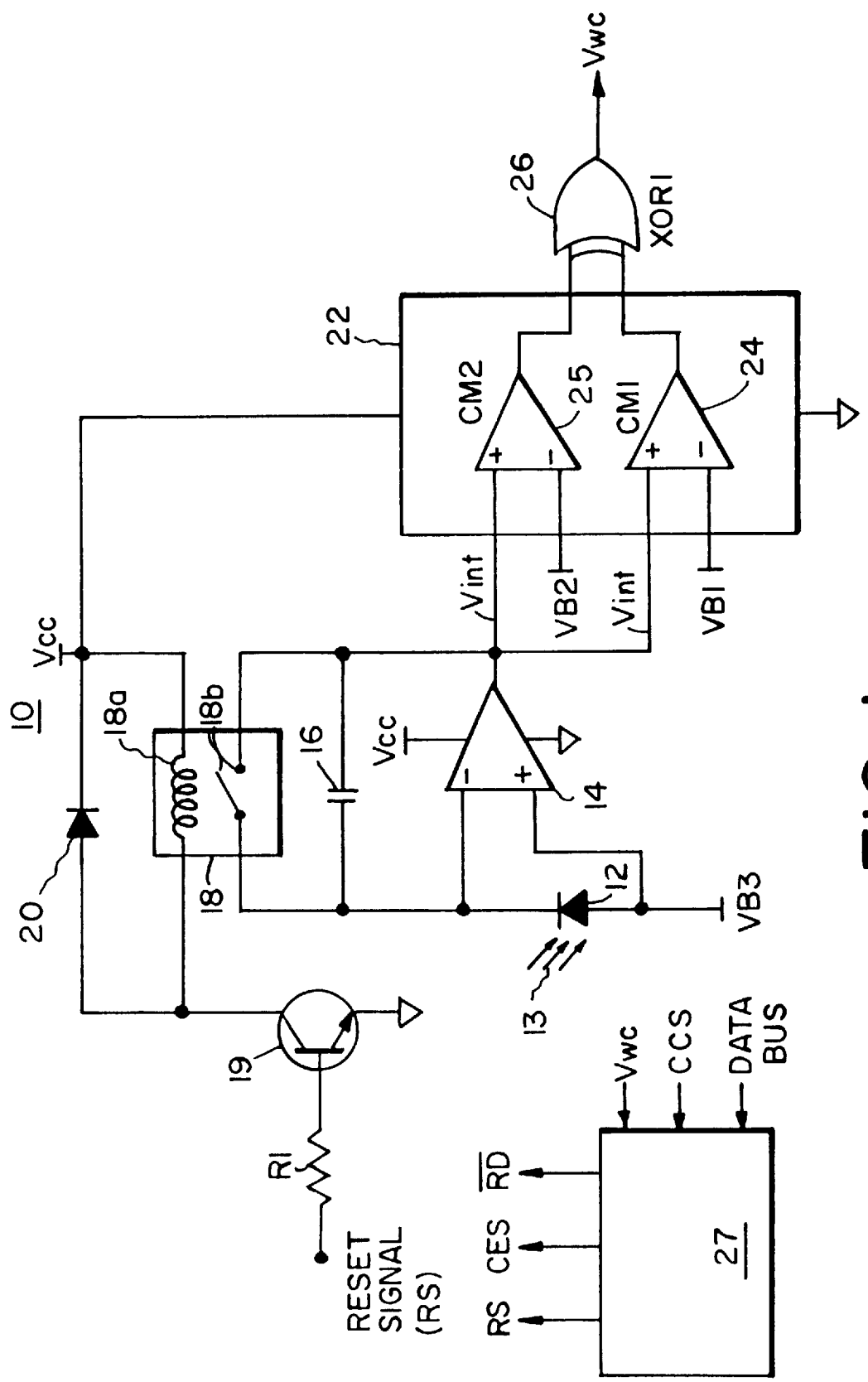
FIG. 1 is a schematic of the circuit embodying the present invention.

Referring to FIG. 1, the improved photodetector integrator circuit 10 of the present invention is shown having a photodetector represented by photodiode 12.

Photodiode 12 produces a photocurrent proportional to the illumination (represented by arrows 13) incident on photodiode 12. Circuit 10 also has a low-bias current operational amplifier 14 to convert the photocurrent from photodiode 12 into voltage. For example, amplifier 14 may be a model LMC660 or LMC6042 manufactured by National Semiconductor. Amplifier 14 is connected to a ground reference voltage and a supply voltage Vcc, which is typically 5 V, but can be any positive voltage with respect to ground within the operating parameters of components within the circuit. Amplifier 14 has inverting and non-inverting inputs connected to the anode and cathode, respectively, of photodiode 12. The inverting input of amplifier 14 (and the cathode of photodiode 12) has applied thereto a bias voltage VB3. Voltage VB3 may be provided by a resistor divider (not shown) from a voltage reference, such as a LM4041 manufactured by National Semiconductor, which is powered by Vcc.

An integrating capacitor 16 is connected across the inverting input of amplifier 14 and the output of amplifier 14 to integrate the output voltage from amplifier 14. The capacitance (Cint) of capacitor 16 depends on the range of possible photocurrent from photodetector 12, but, for example, may be 3pF to 500pF. Amplifier 14 outputs an analog voltage signal Vint. Amplifier 14 and integrating capacitor 16 define the integrator stage of circuit 10 having output Vint, which as a function of time is:

$$Vint = \frac{1}{Cint} \int_0^t i_{PD}(t)dt + VB3 \qquad (1)$$

where an integration period is from 0 to t, and $i_{PD}(t)$ is the photocurrent of photodiode 12.

Circuit 10 has a switch 18 connected in parallel with capacitor 16. Switch 18 is a mechanical switch, preferably a reed relay, and is hereinafter referred to as relay 18. Relay 18 has relay contacts 18b which open and close responsive to current flow through winding or coil 18a. Reset signal (RS) from a microprocessor 27, controls the operation of relay 18. This Reset signal is received at the base of a NPN transistor 19 via a resistor (R1) which, for example, may be 10Kohms. The collector of NPN transistor 19 is connected to one terminal of coil 18a while the other terminal of coil 18a is connected to supply voltage Vcc. A flyback diode 20 is provided in circuit 10 in order to suppress voltage transients associated with abruptly stopping current flow through coil 18a (i.e., its inductive kick) during relay 18 operation. The cathode of flyback diode 20 is connected to the collector of NPN transistor 19, while the anode of flyback diode 20 is connected to supply voltage Vcc. Relay 18, NPN transistor 19, resistor R1 and diode 20 define the reset stage of circuit 10.

The output of the integrator stage, Vin, is connected to the non-inverting inputs of two comparators (CM1) 24 and (CM2) 25. Comparators 24 and 25 are fabricated on the same integrated circuit as a dual comparator, such as models LM319, LF311 or LMC6762 manufactured by National Semiconductor. The inverting input of comparator 24 is biased at a voltage VB1, and inverting input of comparator 25 is biased at a voltage VB2. VB1, VB2, and VB3 are DC voltages and may be provided by a resistor divider network (not shown), preferably connected to a voltage reference, such as a LM4041 manufactured by National Semiconductor, which is powered by Vcc. Voltage VB1 is selected to be more positive than voltage VB3, and voltage VB2 is selected to be more positive than VB1. For example, for Vcc of 5 volts, VB3, VB1 and VB2 may be 400mV, 600 mV and 3.0 V, respectively. The output of each comparator 24 and 25 changes from low to high when Vint exceeds their respective bias voltage, VB1 and VB2, within an offset voltage (typically ±10 mV or less), and hence this change occurs approximately at (or about) their respective bias voltage. These bias voltages VB1 and VB2 also function as threshold voltages for the comparators.

Each output of comparators 24 and 25 is connected to an input of a digital logic exclusive-or gate (XOR1) 26, such as a generic high-speed CMOS gate 74HC86. XOR1 26 processes the output signals of comparators 24 and 25 in accordance with an exclusiveor operation and outputs the result as signal Vwc. Comparators 24 and 25, and XOR1 26 define a window comparator having VB1 and VB2 as lower and upper voltage thresholds such that Vwc from the window comparator will be a logic "1" (high) when Vint is at a voltage between VB1 and VB2, and a logic "0" (low) at all other times. These thresholds (VB1 and VB2) also take into account tolerances in the generation of these threshold voltages and variations due to manufacturing and operational tolerances of the comparators. VB1 and VB2 are not absolute values but can be approximately or about such absolute values.

In the above describe circuit 10, VB3 is selected for reducing the leakage current into amplifier 14 when amplifier 14 is a solid-state operational amplifier constructed using CMOS gates. These gates are protected from ESD by reversed-biased protection diodes at each input of amplifier 14. The leakage current flow through these diodes is inputted into amplifier 14 and can causes error in the amplitude of Vint, such errors are called integration errors. By providing bias voltage VB3, amplifier 14 inputs are biased between its supply voltage and ground (well within their common mode operating range), and these protection diodes are maintained more reversed biased than without VB3. Thus, leakage current injected into amplifier 14 through these protection diodes is minimized, reducing the integration errors in Vint caused by this leakage current. Often, even when the protection diodes are absent in the amplifier 14 inputs, parasitic structures can be present at the amplifier 14 inputs which act similar to these diodes in causing leakage current into the integrator stage. Thus, VB3 can also reduce the leakage current caused by such parasitic structures. Furthermore, VB3 is selected to assure that the cathode of photodiode 12 does not become negative with respect to ground if amplifier 14 saturates.

Preferably, VB1 is selected to exceed VB3 by amplifier 14's worst-case offset voltage in Vint due to integration errors (plus a safety factor, such as 200 mV). VB2 is selected as the upper limit of comparators 24 and 25 common-mode range (for Vcc at 5 V, this upper limit is typically 5 V) minus a safety factor, such as 1 V to 2 V.

Circuit 10 may be utilized in a optical analyzer instrument, such as a spectrophotometer. When this instrument is adapted to be handheld, preferably there is one power supply for Vcc. However, more than one power supply may also be used. Further, the components in circuit 10 may be integrated with other elements of the instrument, such as microprocessor 27, on a common circuit board. Also, in a less preferred embodiment of the present invention, VB3 in circuit 10 may be set to a ground reference voltage, however this may not sufficiently reduce integration errors.

Figure 2:
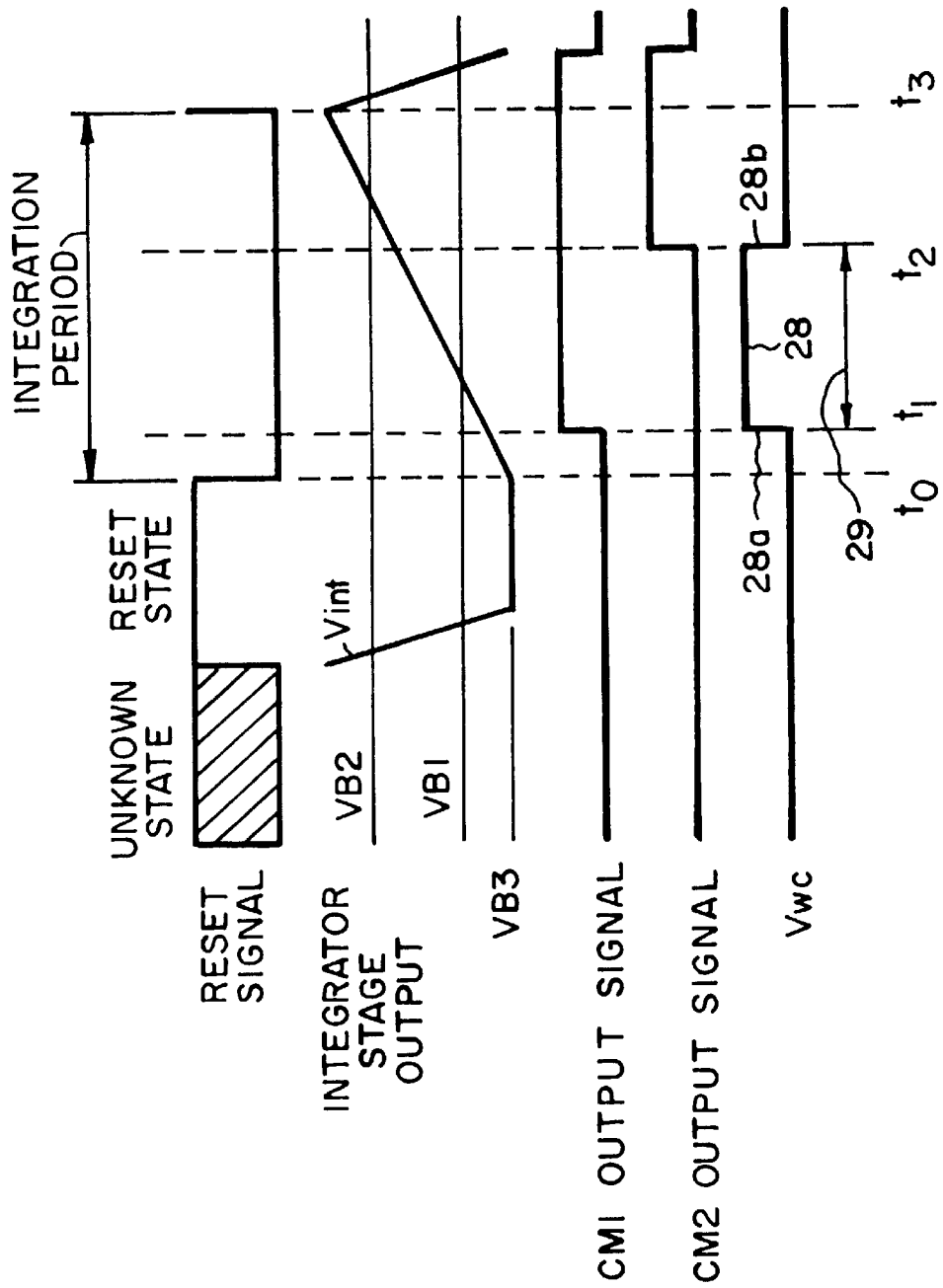
FIG. 2 is a timing diagram illustrating waveforms of signals in the circuit of FIG. 1 during its operation.

Referring to FIG. 2, the operation of circuit 10 of FIG. I will now be discussed. Prior to measurement, microprocessor 27 resets the integrator stage by sending a high Reset signal (logical "1") to the reset stage. This causes transistor 18 to saturate, which allows current to flow through coil 18a and enables (turns on) relay 18 by causing relay contacts 18b to close. Relay 18 depletes charge stored on capacitor 16 to discharge the integrator stage (by providing a low-resistance path shorting integrating capacitor 16), which causes Vint to nearly match VB3 ±Vos of amplifier 14, where Vos is the offset voltage parameter of amplifier 14 (typically Vos is 10 mV or less). During this reset state, amplifier 14 is supplying current to photodiode 12. Optionally, microprocessor 27 may hold the integrator stage in its reset state until a measurement is to be taken.

Once sufficient time has elapsed to insure capacitor 16 is discharged (typically less than a microsecond), a measurement cycle may take place. A measurement cycle begins at time $t_0$ with microprocessor 27 setting the Reset signal low (to a logical "0"). This turns off transistor 19 and ceases current through coil 18a, which in turn opens contacts 18b of relay 18. As stated earlier, flyback diode 20 suppresses the voltage transient associated with abruptly stopping current flow in coil 18a. When contacts 18b open, the integration period is started at time $t_0$. Photocurrent produced by photodiode 12 is now integrated by the integrator stage causing the integrator stage output signal Vint to rise above its reset bias voltage VB3. In the window comparator, once Vint exceeds VB1 (at time $t_1$), the output of comparator 24 changes from low to high and the XOR1 26 output signal, Vwc, switches from low to high (a logic "1"). Eventually (at time $t_2$), Vint exceeds VB2 causing the output of comparator 25 to change from low to high and the XOR1 26 output signal, Vwc, to switch from high to low (a logic "0"). Hence, Vwc defines a measurement signal from the window comparator in the form of a pulse 28 with a pulse width 29 corresponding to the time interval ($t_2 - t_1$) over which Vint increases from the lower voltage threshold of VB1 to the upper voltage threshold of VB2. In other words, the falling and leading edges (28b and 28a) of pulse 28 marks stop and start points of time interval ($t_2-t_1$) within a variable integration period ($t_0 \rightarrow t_3$) and a fixed voltage window (VB2-VB1). As will be discussed later, the time interval (duration or width) of pulse 28 is proportional to the average photocurrent produced by photodiode 12 (per Equation 2 below), which is in turn is proportional to the average light intensity incident onto photodiode 12. The Reset signal is later set high by microprocessor 27 to reset the integrator stage for the next measurement cycle, thereby ending the integration period at time $t_3$.

Microprocessor 27 is preferably a microcontroller, such as models 68HC05, 68HC11 or 68HC16 manufactured by Motorola. Such microcontrollers contain hardware, known as input capture registers, dedicated to measuring pulse widths and periods of digital signals with high accuracy and dynamic range of 8 to 16 bits. Circuit 10 preferably utilizes an input capture register of microcontroller 27 for measuring Vwc in terms of the width 29 of pulse 28. Microcontroller 27 may be part of a module containing photodetector integrator circuit 10 (i.e., on the same circuit board).

Figure 3:
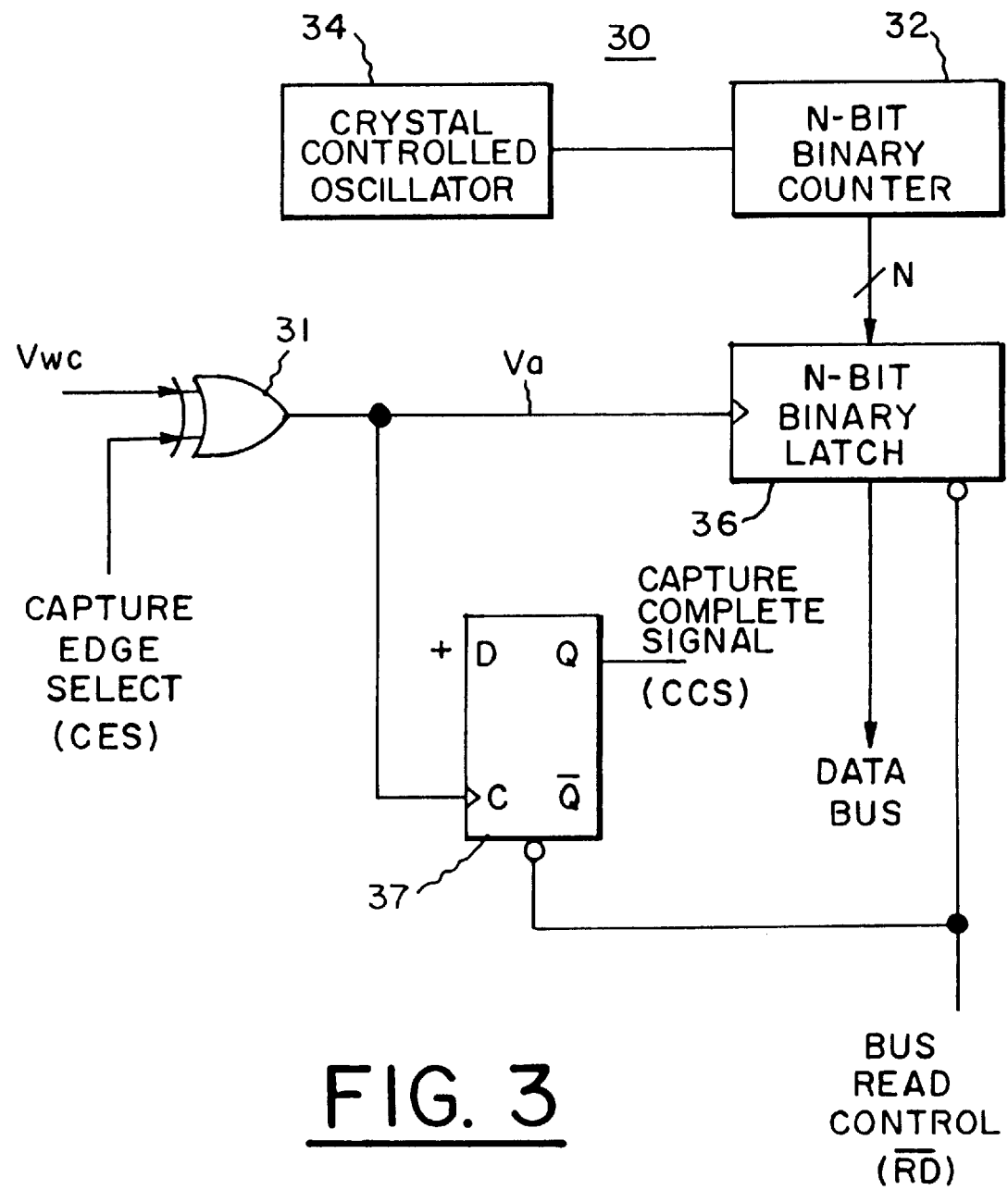
FIG. 3 is a block diagram of the input e register of a microcontroller which receives the measurement signal, Vwc, from the circuit of FIG. 1.

Referring to FIG. 3, a block diagram of a typical input capture register 30 of microcontroller 27 is shown. This diagram has been simplified for purposes of illustrating the present invention. Microcontroller 27 has memory programmed with instructions to operate register 30 for measuring Vwc in terms of pulse width 29 and then using this measured pulse width to calculate the average photocurrent of photodiode 12. Such instructions also control the Reset signal, as discussed above in connection with FIG. 2. Input capture register 30 receives Vwc from XOR1 26 (FIG. 1) at one input of exclusiveor gate 31. Another input of gate 31 receives a capture edge select signal (CES) from microcontroller 27. The output of gate 31, Va, is connected to an N-bit binary latch 36. N for example may equal 16, and represents the number of bits latch 36 can store from an N-bit binary counter 32. N-bit binary counter 32 is a free-running counter which is clocked by a crystal controlled oscillator 34 to assure frequency accuracy. Counter 32 continually up-counts. When the level of Va changes from low to high, latch 36 latches and stores the current value of counter 32 for later retrieval by microcontroller 27 over a data bus. Register 30 also has D-type flip-flop 37 having an input which also receives Va from gate 31. Flip-flop 37 at its Q output sends to microcontroller 27 a capture complete signal (CCS) when the level of Va changes from low to high. Both flip-flop 37 and latch 36 are controlled via a bus read control line (RD), as described below.

To measure Vwc in terms of pulse width 29, the capture edge select signal to gate 31 is first set by microcontroller 27 to high (logical "1") before the start of an integration period. To begin a measurement cycle, Reset signal (FIG. 1) is set to low by microcontroller 27. As Vin increases, register 30 responds to changes in Vwc as follows.

When the leading edge 28a of pulse 28 occurs, the output of gate 31, Va, changes from low to high causing latch 36 to latch the value of counter 32 at time $t_1$. At the same time the counter's value is latched, D-flip-flip 37 is clocked high by the change in Va to high.

In response, the capture complete signal from the Q output of flip-flop 37 changes from low to high, informing microcontroller 27 that a capture event has occurred.

Microcontroller 27 then reads the captured value from latch 36 by sending a bus read control signal, and then storing the value sent via the data bus from latch 36 into memory of microcontroller 27. The bus read control signal is also sent to the CLR input of the flip-flop 37 to clear the flip-flop for the next capture and to set the capture complete signal low. The capture edge select signal is then set low (to a logical "0") causing Va to change from high to low. Consequently, when the falling edge 28b of pulse 28 occurs, Va from gate 31 changes from low to high, causing latch 36 to latch the value of counter 32 at time $t_2$. This change in Va again causes the flip-flop 37 to clock high, sending another capture complete signal to microcontroller 27 indicating that a second capture event has occurred.

After microcontroller 27 has read the contents of latch 36 by sending a read bus signal and storing the received value from latch 36 in its memory, it calculates the numerical difference, M, between the two consecutive (binary) values read from latch 36 of the two capture events associated with the leading and falling edges 28a and 28b of pulse 28. Thus, the time interval ($t_2 - t_1$) is first determined in terms of M, the number of times counter 32 up-counted responsive to oscillator 34 during the duration of width 29 of pulse 28, and hence M represents a measure of Vwc in terms of width 29. The numerical difference M between the two capture events when multiplied by the reciprocal of the crystal controlled oscillator 34 frequency is the actual time interval ($t_2 - t_1$) in seconds. Note that after the value from latch 36 associated with falling edge 28b is read, the Reset signal may be set high by microcontroller 27.

Microcontroller 27 next calculates the average photocurrent produced by photodiode 12 ($i_{PD}$) by the following equation:

$$i_{PD} = Cint \cdot \frac{(VB2 - VB1)}{M \cdot \frac{1}{F_{timer}}} = Cint \cdot \frac{(VB2 - VB1) \cdot F_{timer}}{M} \quad (2)$$

where $F_{timer}$ is the frequency of oscillator 34. For example, $F_{timer}$ may be a fixed frequency between 10KHz and 4MHz. The illumination (and reflectance) incident on photodiode 12 are held constant during the integration period measuring photodiode current $i_{PD}$. The actual values of Cint, the difference between VB2 and VB1 (VB2-VB1), and $F_{timer}$ depend on the possible range of photocurrent from photodiode 12 given such limitations as the available frequencies of $F_{timer}$, and the number of bits N of register 30.

Alternatively, instead of utilizing the input capture register of a microcontroller, a separate capture circuit, or stage of circuit 10, similar to the input capture register 30 of FIG. 3 may be used. This capture circuit would then operate responsive to a programmed microprocessor, such as the above described microcontroller, which controls the Reset and capture edge select signals, and calculates M and $i_{PD}$, per Equation 2. Like register 30, this capture circuit sends into memory of the microprocessor the value of its N-bit latch at both time $t_1$, and $t_2$. Such a capture circuit can increase the dynamic measurement range by increasing the number of bits N by which latch 36 and counter 32 operate. This can allow measuring pulse width 29 (in terms of M) at a greater resolution or over a longer interval beyond 16 bits, the typical dynamic range of input capture register of a microcontroller. Note that a separate capture circuit may have a higher frequency oscillator when the overall measurement time interval of pulse width 29 exceeds the limits of oscillator 34 frequencies available in a typical microcontroller. For instance, counter 32 may be clocked by oscillator 34 beyond 100 Mhz to provide 64 or more bits of dynamic range. Furthermore, implementing such a dynamic range is relatively cost effective since expensive A/D converters are not used.

A feature of circuit 10 is that it reduces the integration errors present in prior art photodetector integrator circuits. Integration errors due to leakage current from either protection diodes at the inputs of amplifier 14, or parasitic structures in the inputs of amplifier 14 which act similar to such diodes, is reduced by biasing the inputs of amplifier 14 by voltage VB3, as described earlier above. Further, integration errors are also reduced because relay 18 in circuit 10 has much lower leakage current than solid-state switching device used in prior art photodetector integrator circuits to reset the integrator stage. Such prior art photodetector integrator circuits typically integrate immediately upon release of a control (reset) signal. These prior art circuits cannot use mechanical relays, such as relay 18, due of the variability in the time needed before the mechanical contacts actually separate (after holding current is discontinued). For example, the actual time the mechanical contacts separate can vary between 0 and 200 milliseconds. Instead, these prior art circuits employ solid-state switching devices to reset their integrator stages to accurately control the start time of integration. Solid-state switching devices have leakage currents orders of magnitude larger than mechanical relays, leading to integration errors by such leakage current flowing into the integrator stage. The present invention overcomes this problem of mechanical relay contact opening variability by commencing the integration period not based on a reset signal, but rather the time at which the integrator stage's output, Vint, exceeds threshold voltage VB1. In other words, a solid-state switching device is not needed in circuit 10 because the window comparator accurately marks the start and stop points of integration independently of how long to relay 18 takes to open, or how variable its opening time is. Relay 18 is preferably a reed relay because its intrinsically high off-state resistance provides very low leakage current.

Circuit 10 eliminates integration errors due to charge injection typical of prior art photodetector integrator circuits. Typically, when any type of solid-state switching device or mechanical relay is turned off, a small portion of the reset signal's energy is capacitively coupled to the device's switch contracts and thus into the integrator stage. This coupling called charge injection, causes the integrator output voltage to offset by an amount equal to Q/Cint at the start of the integration period, where Q is the injected charge in coulombs. The present invention overcomes this problem of charge injection by selecting the difference between VB1 and VB3 larger than Q/Cint, thus completely eliminating charge injection as a source of integrator errors.

By reducing the integration errors of the integration stage in circuit 10, Vint more accurately reflects a voltage proportional to the photocurrent, thereby increasing the accuracy of measured photocurrent, as compared to prior art photodetector integrator circuits having substantially more integration errors.

It is believed that by using relay 18 instead of a solid-state switching device and by eliminating the effects of charge injection into the integrator stage the only principal source of integration errors in circuit 10, although reduced, is from the leakage current of the input of amplifier 14. Thus, the same amplifier may be used as in the prior art photodetector integrator circuits, but with improved accuracy for measuring photocurrents, especially very small photocurrents which would otherwise be unresolvable due to the amount of solid-state switching device leakage current and charge injection at the integrator stage. Consequently, the improvement in accuracy for measuring photocurrents depends on the amount of expected leakage current at the inputs of the chosen model of amplifier 14, and the level to which VB3 reduces that leakage current. Another reason circuit 10 improves accuracy is because the $i_{PD}$ measurement per Equation (2) is based upon parameters which may be accurately controlled, such as Cint, the difference between VB2 and VB1, and the oscillator 34 frequency $F_{timer}$.

Further, circuit 10 does not require the use of a costly A/D converter, as is typical of prior art photodetector integrator circuits. This is because circuit 10 utilizes an input capture register to measure a pulse width over the fixed voltage window (VB2-VB1), rather than digitizing the output voltage signal from an integrator stage over a fixed integration period. Frequently, input capture registers are already present in the microprocessor or microcontroller of an optical measuring instrument, thus designing such instruments to implement photocurrent measuring using circuit 10 is cost effective.

Circuit 10 also is less sensitivity to temperature variation than typical photodetector integrator circuits because comparators CM1 24 and CM2 25 are both on the same dual comparator integrated circuit and hence fabricated on the same die structure. The amount of the offset voltage of each comparator CM1 and CM2 in comparing Vint to their respective bias voltage, VB1 and VB2, is temperature dependent. By comparators CM1 and CM2 being on the same die structure, their operating temperature will be nearly identical, and consequently changes in their offset voltages will be nearly identical. Thus, the performance of CM1 and CM2 track are approximately identical with temperature, and as a result, the pulse width in Vwc is effectively independent of temperature variation.

From the foregoing description, it will be apparent that there has been provided an improved photodetector integrator circuit. Variations and modifications in the herein described circuit in accordance with the invention will undoubted suggest themselves to those skilled in the art. Accordingly, the foregoing description should be taken as illustrative and not in a limiting sense.

What is claimed is:

1. A circuit comprising:
    a photodetector which produces a current responsive to incident illumination;
    an integrator stage coupled to said photodetector which converts said current into voltage and integrates said voltage over an integration period to provide an output signal; and
    a window comparator which receives said output signal from said integrator stage and compares said output signal to a first threshold and a second threshold to provide a measurement signal defining a pulse having a width which corresponds to the time interval over which said output signal increases from said first threshold to said second threshold, wherein said second threshold is greater than said first threshold.

2. The circuit according to claim 1 wherein said integrator stage has two inputs from said photodetector which are biased by a bias voltage, wherein said bias voltage is below said first threshold.

3. The circuit according to claim 2 further comprising a switch coupled to said integrator stage which when enabled resets said integrator stage to provide said output signal substantially equalling said bias voltage.

4. The circuit according to claim 3 further comprising means for controlling said switch to reset said integrator stage, and determining the time interval corresponding to the width of said pulse, said time interval being proportional to the current produced by said photodetector.

5. The circuit according to claim 3 further comprising a diode coupled between said switch and a reference voltage of said circuit to suppress transients produced by said switch.

6. The circuit according to claim 3 wherein said switch is a mechanical relay.

7. The circuit according to claim 4 wherein said integrator stage further comprises an amplifier and a capacitor connected across one of said two inputs of said integrator stage and an output providing said output signal.

8. The circuit according to claim 7 wherein said switch is connected across said capacitor.

9. The circuit according to claim 7 wherein said means further comprises means for measuring the current produced by said photodetector responsive to the capacitance of said integrating capacitor, the difference between said second and first thresholds, and the reciprocal of said determined time interval.

10. The circuit according to claim 9 wherein said means is provided by a microcontroller comprising an input capture register for receiving said measurement signal.

11. The circuit according to claim 4 wherein said means for determining the time interval operates with a dynamic range greater than 16 bits.

12. The circuit according to claim 1 wherein said integrator stage has two inputs from the photodetector, and one of said inputs is referenced to ground.

13. The circuit according to claim 1 wherein said window comparator comprises:
    a first comparator which compares said output signal from said integrator stage to said first threshold and outputs a first signal which is high when said output signal exceed said first threshold, and low otherwise;
    a second comparator which compares said output signal from said integrator stage to said second threshold and outputs a second signal which is high when said output signal exceed said second threshold, and low otherwise; and
    an XOR gate which receives said first and second signals to provides said measurement signal.

14. The circuit according to claim 13 wherein said first and second comparators are located on the same die structure.

15. The circuit according to claim 1 wherein said photodetector is a photodiode.

16. A method comprising the steps of:

providing a current responsive to incident illumination with the aid of a photodetector;

converting said current into voltage;

integrating said voltage over an integration period to provide an output signal;

comparing said output signal to a first threshold;

outputting a first signal which is high when said output signal exceeds said first threshold, and low otherwise;

comparing said output signal to a second threshold which is greater than said first threshold;

outputting a second signal which is high when said output signal exceeds said second threshold, and low otherwise; and combining said first and second signals to provide a measurement signal which is high for the interval when said first signal is high until said second signal is high, and low otherwise.

17. The method according to claim 16 further comprising the step of providing a bias voltage to said photodetector, wherein said bias voltage is below said first threshold.

18. The method according to claim 17 further comprising the step of resetting said output signal substantially to said bias voltage with the aid of a switch.

19. The method according to claim 18 further comprising the steps of:

controlling said d switch to carry out said resetting step; and determining the time of said interval when said measurement signal is high, wherein the time of said interval is proportional to the current produced by said photodetector.

20. The method according to claim 19 where in said determining step is carried out with a dynamic range greater than 16 bits.

21. The method according to claim 19 further comprising the step of:

measuring the current produced by said photodetector responsive to said determined time interval.

22. The method according to claim 18 further comprising the step of providing a diode coupled between said switch and a reference voltage to suppress transients produced by said switch.

23. The method according to claim 18 wherein said switch is a mechanical relay.

24. The method according to claim 16 wherein said photodetector is a photodiode.

* * * * *